United States Patent
Chang et al.

(10) Patent No.: US 10,969,103 B2
(45) Date of Patent: Apr. 6, 2021

(54) PROTECTIVE PANEL AND FRAME THEREFOR

(71) Applicant: UNITED TECHNOLOGIES CORPORATION, Hartford, CT (US)

(72) Inventors: Hoyt Y. Chang, Manchester, CT (US); Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1195 days.

(21) Appl. No.: 14/912,132

(22) PCT Filed: Aug. 11, 2014

(86) PCT No.: PCT/US2014/050508
§ 371 (c)(1),
(2) Date: Feb. 15, 2016

(87) PCT Pub. No.: WO2015/023576
PCT Pub. Date: Feb. 19, 2015

(65) Prior Publication Data
US 2016/0201910 A1 Jul. 14, 2016

Related U.S. Application Data

(60) Provisional application No. 61/866,291, filed on Aug. 15, 2013.

(51) Int. Cl.
*F23R 3/60* (2006.01)
*F23R 3/00* (2006.01)
(Continued)

(52) U.S. Cl.
CPC .............. *F23R 3/002* (2013.01); *F01D 11/08* (2013.01); *F02C 7/24* (2013.01); *F02K 1/822* (2013.01); *F23M 5/04* (2013.01); *F23R 3/007* (2013.01); *F23R 3/60* (2013.01); *F02K 1/82* (2013.01); *F05D 2220/32* (2013.01);
(Continued)

(58) Field of Classification Search
CPC .. F23R 3/002; F23R 3/007; F23R 3/60; F02K 1/80; F02K 1/82; F02K 1/822
See application file for complete search history.

(56) References Cited

U.S. PATENT DOCUMENTS 3,956,886 A   5/1976  Sedgwick
5,333,995 A * 8/1994  Jacobs .................. F01D 5/3092
                                                      415/173.1
(Continued)

FOREIGN PATENT DOCUMENTS

DE   4114768 A1 * 11/1991  .......... E04F 13/0812
EP   2107307       10/2009

OTHER PUBLICATIONS

English translation of DE 4114768 A1.*
(Continued)

*Primary Examiner* — Thomas P Burke
(74) *Attorney, Agent, or Firm* — Carlson, Gaskey & Olds, P.C.

(57) ABSTRACT

One exemplary embodiment of this disclosure relates to a gas turbine engine including a plate, a frame attached to the plate, and a panel. The panel is supported by the frame.

14 Claims, 5 Drawing Sheets

(51) Int. Cl.
  *F02K 1/82* (2006.01)
  *F01D 11/08* (2006.01)
  *F23M 5/04* (2006.01)
  *F02C 7/24* (2006.01)

(52) U.S. Cl.
  CPC ...... *F05D 2230/60* (2013.01); *F05D 2240/11* (2013.01); *F05D 2240/35* (2013.01); *F05D 2300/6033* (2013.01); *F23R 2900/00017* (2013.01); *Y02T 50/60* (2013.01)

(56) References Cited

U.S. PATENT DOCUMENTS

| | | | | |
|---|---|---|---|---|
| 6,041,590 A * | 3/2000 | Hayton | ............. | F02K 1/822 60/766 |
| 6,418,973 B1 * | 7/2002 | Cox | ............. | B32B 5/26 139/383 R |
| 6,482,485 B1 * | 11/2002 | Pichon | ............. | F02K 1/822 165/169 |
| 9,638,133 B2 * | 5/2017 | Kramer | ............. | F02K 1/822 |
| 9,657,948 B2 * | 5/2017 | Vogtmann | ............. | F23R 3/005 |
| 2004/0074239 A1 * | 4/2004 | Tiemann | ............. | F23M 5/02 60/798 |
| 2011/0318531 A1 * | 12/2011 | Krusch | ............. | F23M 5/04 428/131 |
| 2012/0195755 A1 * | 8/2012 | Gasmen | ............. | F01D 17/162 415/230 |
| 2012/0301691 A1 * | 11/2012 | Charleux | ............. | C04B 35/52 428/213 |
| 2015/0285496 A1 * | 10/2015 | Grendel | ............. | F23M 5/04 60/753 |

OTHER PUBLICATIONS

The International Preliminary Report on Patentability for PCT Application No. PCT/US2014/050508, dated Feb. 25, 2016.
Extended European Search Report for European Patent Application No. 14836394.8 completed Feb. 22, 2017.

* cited by examiner

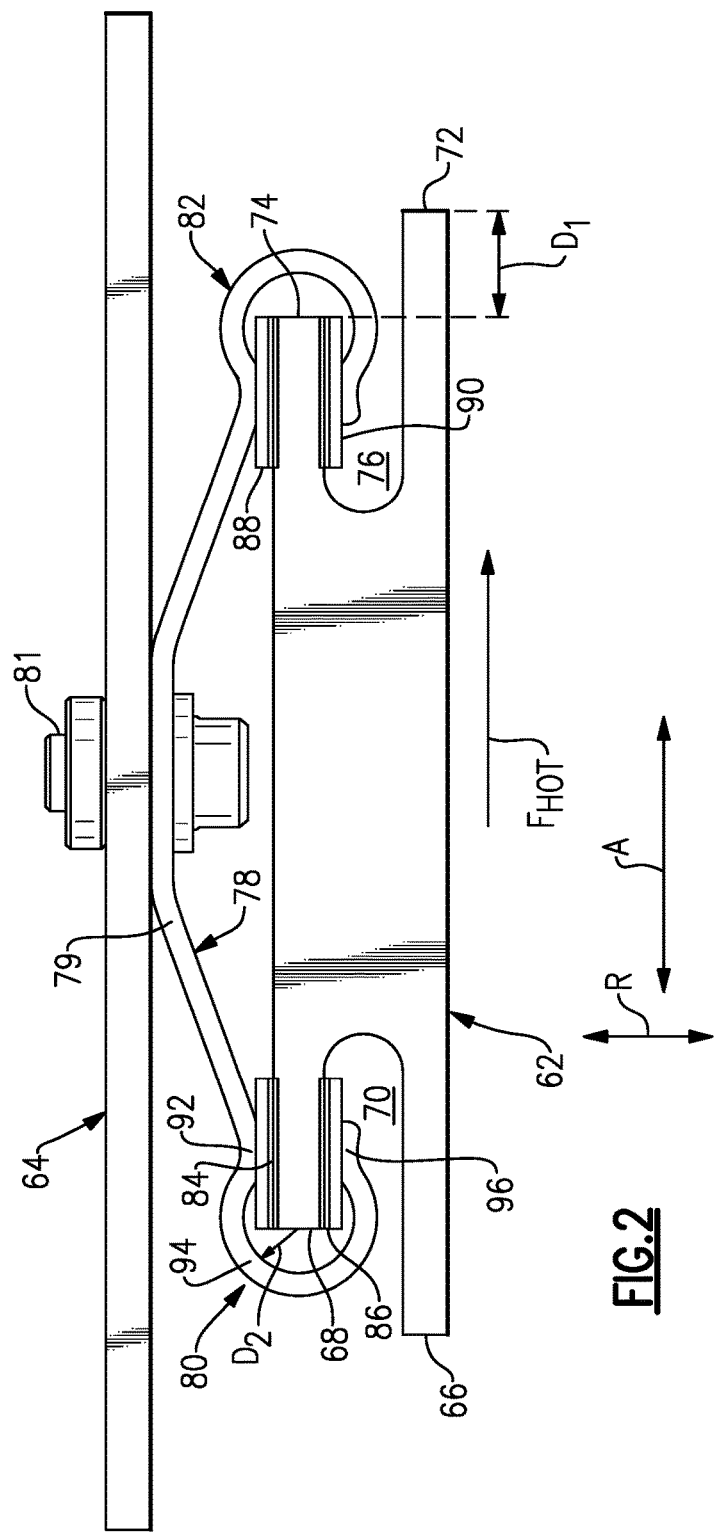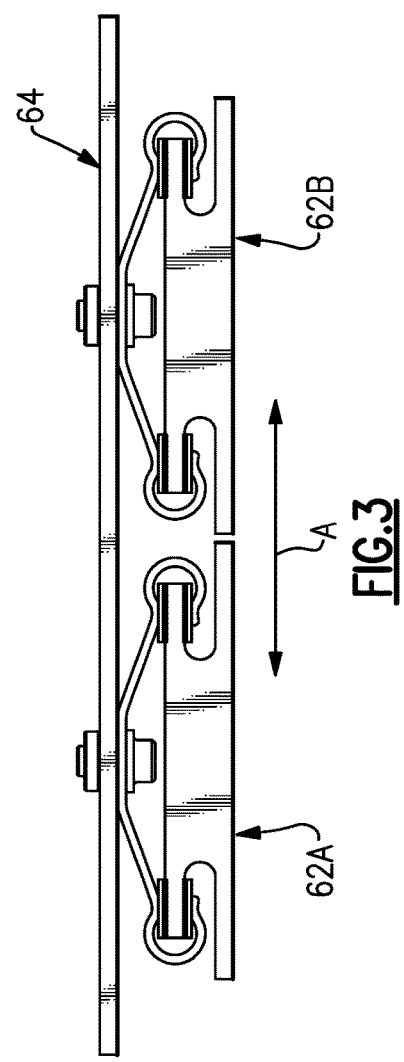

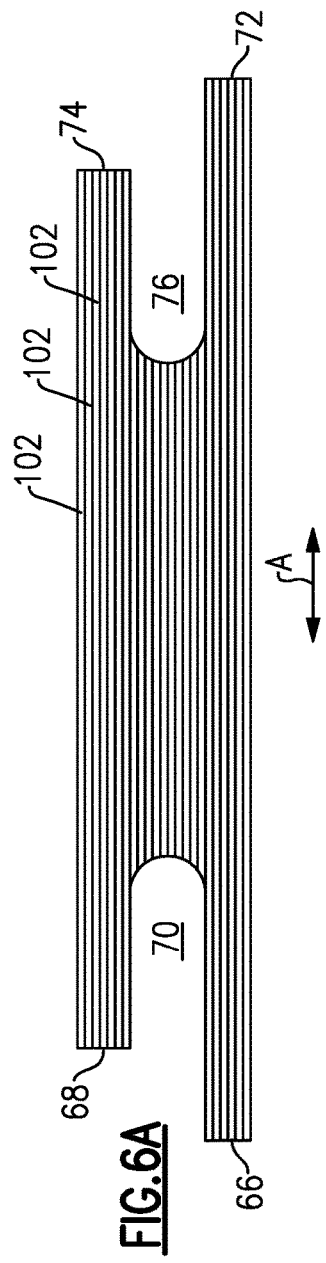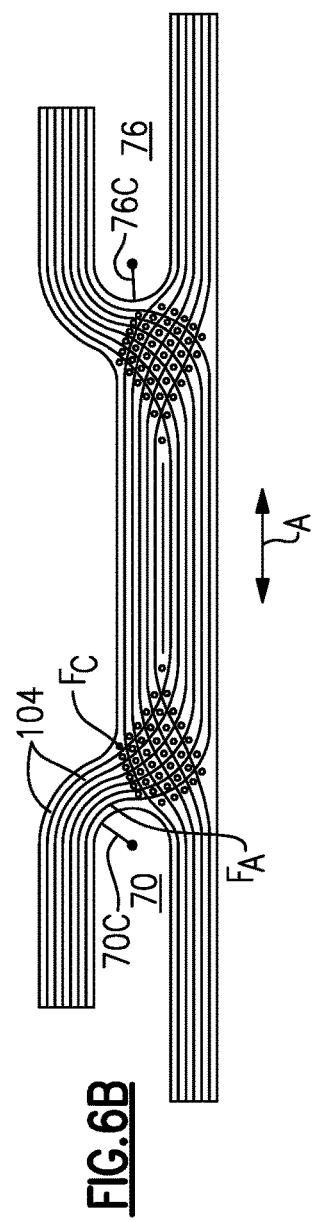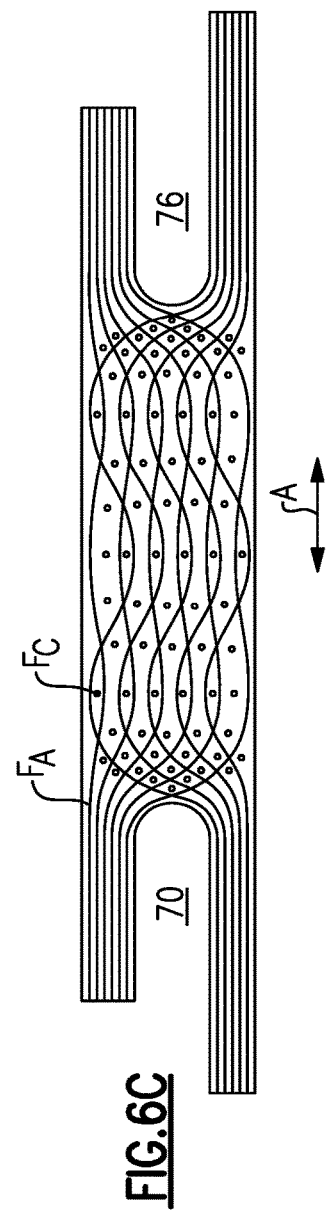

PROTECTIVE PANEL AND FRAME THEREFOR

CROSS-REFERENCE TO RELATED APPLICATION

This application claims priority to U.S. Provisional Application No. 61/866,291 filed Aug. 15, 2013.

BACKGROUND

Gas turbine engines include a core flow path where air is communicated to a combustor section, combined with fuel, and ignited to generate a high pressure exhaust gas stream. Various portions of the engine are directly exposed to this high pressure exhaust gas stream. Some example portions include combustor liners and exit nozzles.

The high pressure exhaust gas stream includes relatively hot gases. The portions of the engine that are exposed to these hot gases include metal plates (e.g., walls, brackets, supports) configured to absorb various structural load in the engine. In one known example, to protect the metal plates from a hot gas path, ceramic matrix composite (CMC) panels are directly mounted to the metal plates with threaded fasteners.

SUMMARY

One exemplary embodiment of this disclosure relates to a gas turbine engine including a plate, a frame attached to the plate, and a panel. The panel is supported by the frame.

In a further embodiment of any of the above, the panel is formed of a ceramic matrix composite (CMC) material.

In a further embodiment of any of the above, the panel is spaced-apart from the plate by the frame.

In a further embodiment of any of the above, the panel includes first and second radially inner flanges, and first and second radially outer flanges spaced-apart from the first and second radially inner flanges by first and second slots.

In a further embodiment of any of the above, the frame includes a first grip engaging the first radially outer flange of the panel, and a second grip engaging the second radially outer flange of the panel.

In a further embodiment of any of the above, the first and second grips are semicircular and engage both a radially outer surface and a radially inner surface of a respective one of the first radially outer flange and the second radially outer flange.

In a further embodiment of any of the above, the frame includes an outer frame and an inner frame providing the first and second grips, the outer frame engaging a radially inner surface of the first radially outer flange and a radially inner surface of the second radially outer flange, the inner frame engaging a radially outer surface of the first radially outer flange and a radially outer surface of the second radially outer flange.

In a further embodiment of any of the above, a plurality of shims are provided between the first and second radially outer flanges and the first and second grips such that the first and second grips do not directly contact the first and second radially outer flanges.

In a further embodiment of any of the above, the plurality of shims each include bends at ends thereof to prevent movement of the shims relative to the panel.

In a further embodiment of any of the above, the plurality of shims each include grooves receiving projections of an associated one of the first grip and the second grip.

In a further embodiment of any of the above, the plate is a portion of one of a combustor liner and an exhaust nozzle.

In another exemplary embodiment according to this disclosure, a panel for a gas turbine engine includes a radially outer flange, and a radially inner flange protruding axially beyond the radially outer flange.

In a further embodiment of any of the above, the panel includes a slot formed between the radially inner and radially outer flanges.

In a further embodiment of any of the above, the panel is formed of a ceramic matric composite (CMC) material.

In a further embodiment of any of the above, the CMC material includes a plurality of axial fibers, a length of the axial fibers arranged to follow a contour of the slot.

In a further embodiment of any of the above, the CMC material includes a plurality of circumferential fibers interleaved with the plurality of axial fibers.

An exemplary method according to this disclosure includes attaching a frame to a plate, and sliding a panel into an interference fit with the frame.

In a further embodiment of any of the above, the step of attaching the frame to the plate includes attaching an inner frame and an outer frame to the plate.

In a further embodiment of any of the above, the step of attaching the frame to the plate occurs before the sliding step.

In a further embodiment of any of the above, the method further includes sliding a plurality of shims into an interference fit with the frame, the shims provided between the frame and the panel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 2 is a side view of a panel and frame according to this disclosure.

FIG. 3 illustrates two panels (and associated frames) arranged axially relative to one another.

FIGS. 6A-6C illustrate example panels having stacked fabric, crossover, and multi-fiber interlock arrangements, respectively.

DETAILED DESCRIPTION

Figure 1:
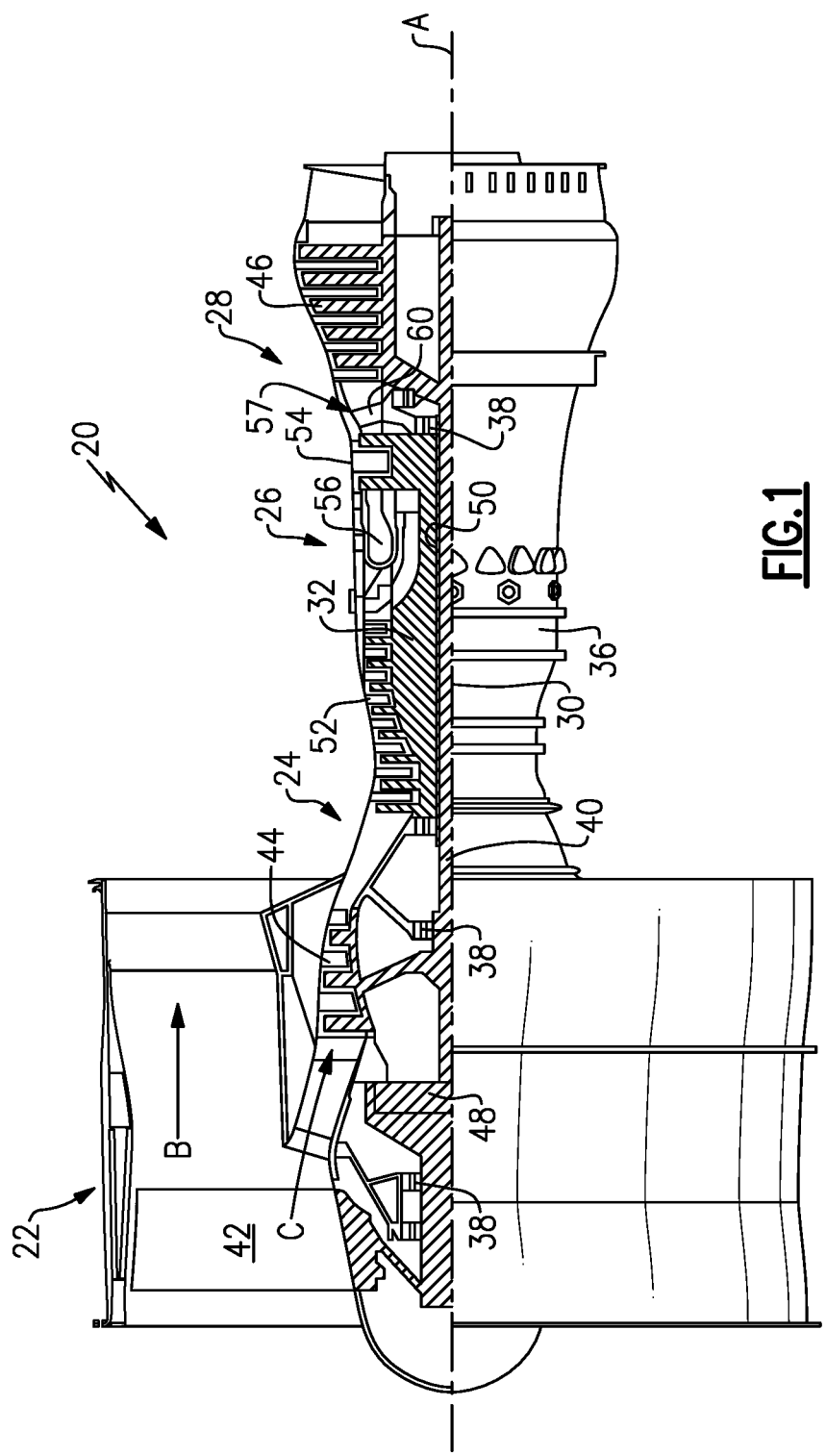
FIG. 1 illustrates a schematic, cross-sectional view of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 60, which are in the core airflow path and function as an inlet guide vane for the low pressure turbine 46. Utilizing the vane 60 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

FIG. 2 illustrates an arrangement including a panel 62 for protecting a plate 64 according to this disclosure. In this example, the panel 62 is made of a ceramic matrix composite (CMC) material, and the plate 64 is made of a metal. CMC has the benefit of being relatively temperature resistant, while metal has the benefit of providing increased structural support. It should be understood that this application extends to other materials with similar temperature resistant and structural properties. For instance, the panel 62 could be formed from a single, monolithic ceramic block.

The plate 64 in one example is a combustor liner. In another example, the plate 64 is an exhaust nozzle. It should be understood that this disclosure extends to various other types of plates arranged within the gas turbine engine 20 that may be exposed to a hot gas path, $F_{HOT}$. The plate 64 may be flat as shown, for some applications such as an exhaust nozzle side wall, or it may be curved or have a hoop shape, in other applications such as a combustor liner. Likewise, the panel 62 may be flat as shown, or have a bend or curvature to it, such that the surface exposed to the hot gas path $F_{HOT}$ has either a flat or curved shape.

In this example, the panel 62 includes radially inner and radially outer flanges 66, 68 at a leading edge of the panel, spaced apart in a radial direction R (substantially normal to the engine central longitudinal axis A) by a slot 70 provided therebetween. The panel further includes radially inner and radially outer flanges 72, 74 at a trailing edge, and a slot 76 therebetween.

As illustrated herein, the radially inner flanges 66, 72 protrude a distance $D_1$ axially beyond a respective one of the radially outer flanges 68, 74. As will be appreciated from the below, this extension provides protection to the plate 64 and the associated frame 78, and further allows the radially inner flanges 66, 72 to be positioned in close proximity to the radially inner flanges of a similar panel (e.g., as generally represented in FIG. 3).

The panel 62 is attached to the plate 64 by way of a frame 78. In this example, the frame 78 is a single, unitary structure and is made of metal. The frame 78 securely and resiliently supports the panel 62 relative to the plate 64 and dampens vibrations of the panel 62. Further, because the panel 62 and the plate 64 are not directly connected, the frame 78 provides an effective support even considering the different rates of thermal expansion between the panel 62 and plate 64.

The frame 78 includes a pair of grips 80, 82 configured to engage the radially outer flanges 68, 74 of the panel 62, and to support the panel 62 by holding the radially outer flanges 68, 74 in compression. The grips 80, 82 in this example are connected to one another by a main body portion 79, which is fastened to the plate 64 by way of a fastener 81. Each of the grips 80, 82 contacts each radially outer flange 68, 74 at two radially opposed points, as will be discussed in detail below.

In this example, a plurality of shims 84, 86, 88, and 90 are provided between the radially outer flanges 68, 74 and the grips 80, 82. It should be understood that shims are not required, however the shims 84, 86, 88, 90 have the benefit of spreading a load from the grips 80, 82 to the radially outer flanges 68, 74 to avoid damage to the panel 62.

The grips 80, 82, are semicircular in this example. It should be understood that other shapes could be used, however. With reference to the grip 80 (and, it should be understood that the grip 82 includes similar features), the grip 80 includes a first projection 92 configured to engage an radially outer shim 84, and a semicircular portion 94 that leads to a second projection 96 configured to engage a radially inner shim 86. The semicircular portion 94 is formed with a radius $D_2$. The radius $D_2$ dictates the load provided by the grips 80, 82 relative to the radially outer flanges 68, 74. An appropriate radius $D_2$ can be selected to provide a desired load, depending on the particular application.

The arrangement of FIG. 2 provides a panel 62 that protects the plate 64 from a relatively hot gas path $F_{HOT}$. In one example, the hot gas path $F_{HOT}$ is the core flow path C. Depending on where the panel 62 is provided in the engine 20, the hot gas path $F_{HOT}$ may be provided by other flow paths.

Figure 4:
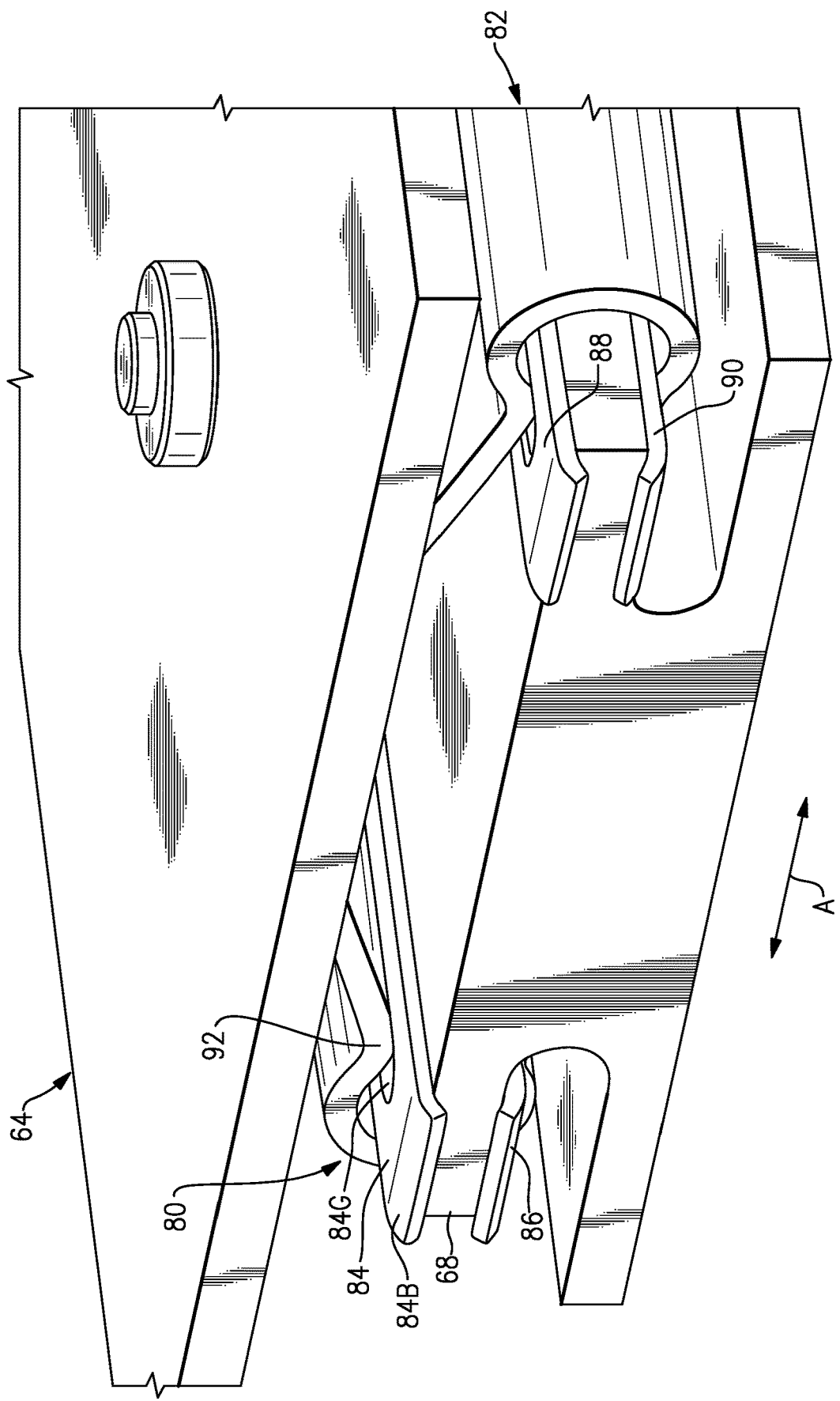
FIG. 4 is a perspective view of the panel and frame according to this disclosure, and in particular illustrates the detail of the shims.

The panels 62 can be arranged axially in series, as illustrated in FIG. 3, wherein the panel 62A is arranged axially upstream of panel 62B. The panels 62 can further be arranged circumferentially around the engine central longitudinal axis A to provide a sufficient level of thermal protection for the plate 64. Alternatively, or in combination, panels can be arranged circumferentially adjacent one another (similar to what is illustrated in FIG. 3) about the engine central longitudinal axis A FIG. 4 is a perspective view illustrating the engagement between the grips 80, 82 and the shims 84, 86, 88, 90. With reference to radially outer shim 84, the shim 84 is provided with a bend 84B at its ends to maintain the shim 84 in circumferential position relative to the radially outer flange 68. The shim 84 further includes a groove 84G along the length thereof to receive the first projection 92 of the grip 80. The shims 86, 88, 90 also include bends and grooves similar to the bend 84B and groove 84G. For example, the shim 86 includes a groove therein receiving the second projection 96 of the grip 80. The bends and grooves ensure proper alignment between the shims 84, 86, 88, 90 and the panel 62, and an adequate engagement between the shims 84, 86, 88, 90 and the grips 80, 82.

In one example assembly method, the frame 78 is first attached to the plate 64 by way of the fastener 81. Then, the shims 84, 86, 88, 90 are provided adjacent the flanges 68, 74, and the assembly is slid (e.g., in or out the page in FIG. 2) into an interference fit with the grips 80, 82. The bends in the shims 84, 86, 88, 90 facilitate assembly by engaging and radially separating the grips 80, 82 when the initially slid into contact the grips 80, 82. Alternatively, the frame 78 could be slid into an interference fit with the shims 84, 86, 88, 90 and the flanges 68, 74, and then mounted to the plate 64.

In one example, the shims 84, 86, 88, 90 are secured to the flanges 68, 74 by way of a fastener or an adhesive. In another example, the compression force provided by the grips 80, 82 creates an interference fit without the need for additional fasteners or adhesive.

Figure 5:
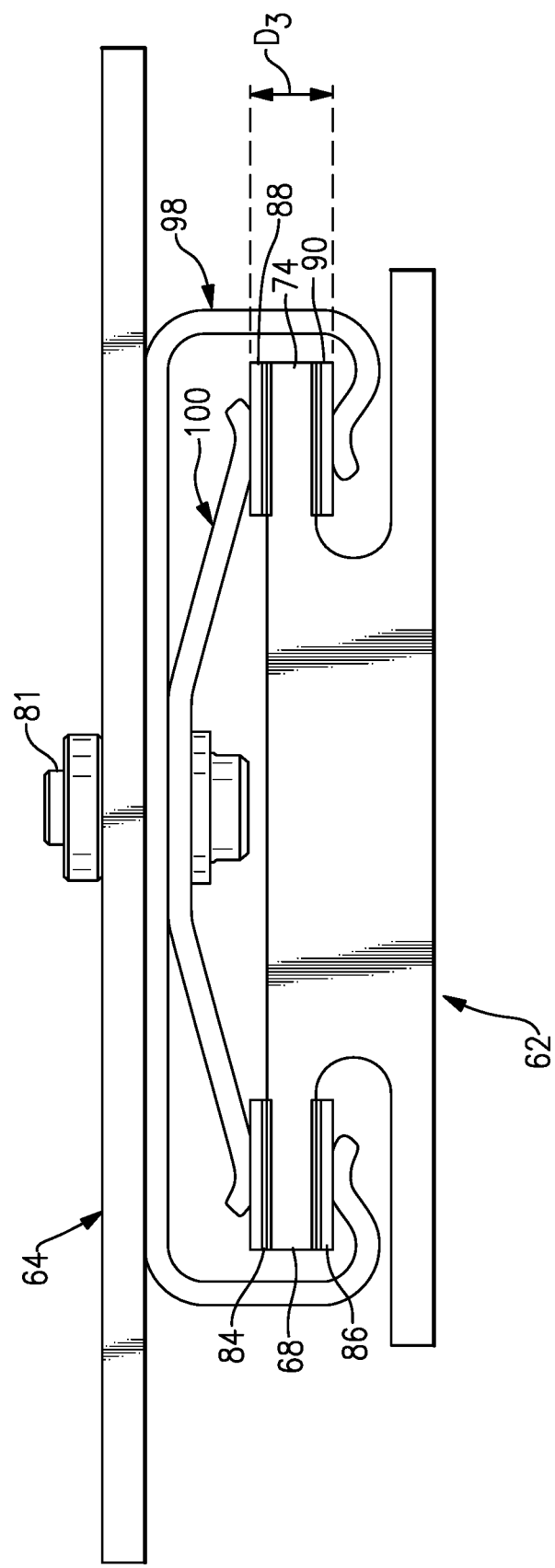
FIG. 5 illustrates an alternate frame according to this disclosure.

FIG. 5 illustrates an alternate arrangement for supporting the panel 62 including a two piece frame. The two piece frame includes an outer frame 98 and an inner frame 100. Each of the outer frame 98 and the inner frame 100 are attached to the panel 64 via a fastener 81.

In this example, the outer frame 98 extends from the plate 64 axially beyond the radially outer flanges 68, 74 and engages the radially inner shims 86, 90. The inner frame 100 extends from the fastener 81 to the radially outer shims 84, 88. The outer and inner frames 98, 100 include projections (like the projections 92, 96) received in grooves in the shims 84, 86, 88, 90. The two piece frame provides a resilient support for the panel 62 by the outer frame 98 urging the panel 62 in a radially inward direction, and the inner frame 100 urging the panel 62 in a radially outward direction.

Because of the two piece design, the load applied to the shims 84, 86, 88, 90 is adjustable by varying the distance $D_3$ between the outer and inner frames 98, 100. In other words, an appropriate load can be selected by adjusting the size and relative positioning of the outer and inner frames 98, 100.

The unitary frame of FIGS. 2-4 may have the benefit of being more easily assembled than the two piece frame of FIG. 5 (e.g., because only a single frame 78 needs to be attached to the plate 64), however the example of FIG. 5 may have the added benefit of easily being able to adjust the load on the panel (e.g., by varying the distance $D_3$).

FIG. 6A-6C illustrate example CMC panels 62. In the example of FIG. 6A, various CMC sheets 102 are stacked on one another and formed together. Once formed, the slots 70, 76 and flanges 66, 68, 72, 74 are machined. Alternatively, the sheets may be cut to the right size, and then laid up against a mold in order to form the slots and flanges. While cost effective, this arrangement may experience cracking and/or delaminating of the CMC sheets 102 in the slots 70, 76 due to potentially high stress concentrations.

In FIG. 6B, a number of CMC sheets 104 are provided such that the axial length of the fibers $F_A$ follows the semi-circular contour 70C, 76C of the slots 70, 76. The axial fibers $F_A$ further interlock and cross over a plurality of circumferential fibers $F_C$ for increased strength. These circumferential fibers $F_C$ run in-and-out of the page relative to FIG. 6B. Because the axial fibers $F_A$ generally follow the contour of the slots 70, 76, the stresses in the slots 70, 76 are reduced, and the chances of cracking or delaminating are minimized.

FIG. 6C illustrates another example where the axial fibers $F_A$ generally follow the contour of the slots 70, 76. Again, this provides reduced stress concentrations in the slots 70, 76. The example of FIG. 6C includes more interweaving (relative to FIG. 6B) between circumferential fibers $F_C$ and axial fibers $F_A$, and thus may be more expensive to manufacture. However, the increased interweaving provides an extremely effective and secure CMC panel. Depending on the particular application, an appropriate arrangement for the panel 62, including but not limited to those illustrated in FIGS. 6A-6C, can be selected.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
a plate;
a frame attached to the plate; and
a panel supported by the frame, wherein the panel is spaced-apart from the plate by the frame such that the panel and the plate are not directly connected;
wherein the panel includes a first radially inner flange and a second radially inner flange, and a first radially outer flange and a second radially outer flange spaced-apart from the first radially inner flange and the second radially inner flange by a first slot and a second slot;
wherein the frame includes a first grip engaging the first radially outer flange of the panel, and a second grip engaging the second radially outer flange of the panel; and
wherein the first grip and second grip engage both a radially outer surface and a radially inner surface of a respective one of the first radially outer flange and the second radially outer flange.

2. The gas turbine engine as recited in claim 1, wherein the panel is formed of a ceramic matrix composite (CMC) material.

3. The gas turbine engine as recited in claim 1, wherein the first grip and the second grip are semicircular and include a first projection engaging radially outer surface and a second projection engaging a radially inner surface of a respective one of the first radially outer flange and the second radially outer flange, the first and second projections connected by a respective semicircular portion extending around a respective one of the first radially outer flange and the second radially outer flange.

4. The gas turbine engine as recited in claim 1, wherein the frame includes an outer frame and an inner frame providing the first grip and the second grip, the outer frame engaging a radially inner surface of the first radially outer flange and a radially inner surface of the second radially outer flange, the inner frame engaging a radially outer surface of the first radially outer flange and a radially outer surface of the second radially outer flange.

5. The gas turbine engine as recited in claim 1, including a plurality of shims provided between the first radially outer flange and the second radially outer flange and the first grip and the second grip such that the first and second grips do not directly contact the first and second radially outer flanges.

6. The gas turbine engine as recited in claim 5, wherein the plurality of shims each include bends at circumferential ends thereof to prevent movement of the shims relative to the panel.

7. The gas turbine engine as recited in claim 5, wherein the plurality of shims each include grooves extending circumferentially along the respective shim, each of the grooves receiving projections of an associated one of the first grip and the second grip.

8. The gas turbine engine as recited in claim 1, wherein the plate is a portion of one of a combustor liner and an exhaust nozzle.

9. A panel for a gas turbine engine, comprising:
a radially outer flange; and
a radially inner flange protruding axially beyond the radially outer flange;
a slot formed between the radially inner flange and the radially outer flange;
wherein the panel is formed of a ceramic matric composite (CMC) material; and
wherein the CMC material includes a plurality of axial fibers, a length of the axial fibers arranged to follow a contour of the slot.

10. The panel as recited in claim 9, wherein the CMC material includes a plurality of circumferential fibers interleaved with the plurality of axial fibers.

11. A method of mounting a panel to a plate, comprising:
attaching a frame to the plate; and
sliding the panel into an interference fit with the frame;
wherein the panel is spaced-apart from the plate by the frame such that the panel and the plate are not directly connected;
wherein the panel includes first radially inner flange and a second radially inner flange, and a first radially outer flange and a second radially outer flange spaced-apart from the first radially inner flange and the second radially inner flange by a first slot and a second slot;
wherein the frame includes a first grip engaging the first radially outer flange of the panel, and a second grip engaging the second radially outer flange of the panel; and
wherein the first grip and second grip engage both a radially outer surface and a radially inner surface of a respective one of the first radially outer flange and the second radially outer flange.

12. The method as recited in claim 11, wherein attaching the frame to the plate includes attaching an inner frame and an outer frame to the plate.

13. The method as recited in claim 11, wherein attaching the frame to the plate occurs before the panel is slid into an interference fit with the frame.

14. The method as recited in claim 11, including sliding a plurality of shims into an interference fit with the frame, the shims provided between the frame and the panel.

* * * * *